(12) United States Patent
Littlejohn et al.

(10) Patent No.: US 12,263,985 B2
(45) Date of Patent: Apr. 1, 2025

(54) PRESS-FORMED DISPOSABLE CONTAINER MADE FROM A LAMINATED PAPERBOARD STRUCTURE

(71) Applicant: GPCP IP Holdings LLC, Atlanta, GA (US)

(72) Inventors: Mark B. Littlejohn, Appleton, WI (US); Michael A. Breining, Neenah, WI (US)

(73) Assignee: GPCP IP HOLDINGS LLC

( * ) Notice: Subject to any disclaimer, the term of this patent is extended or adjusted under 35 U.S.C. 154(b) by 1214 days.

(21) Appl. No.: 17/014,791

(22) Filed: Sep. 8, 2020

(65) Prior Publication Data

US 2020/0399011 A1    Dec. 24, 2020

Related U.S. Application Data

(63) Continuation-in-part of application No. 14/943,694, filed on Nov. 17, 2015, now Pat. No. 10,765,264.

(60) Provisional application No. 62/080,659, filed on Nov. 17, 2014.

(51) Int. Cl.
| | |
|---|---|
| *B65D 1/34* | (2006.01) |
| *B32B 29/00* | (2006.01) |
| *B65D 65/40* | (2006.01) |
| *B65D 65/42* | (2006.01) |
| *B65D 65/46* | (2006.01) |

(52) U.S. Cl.
CPC .............. *B65D 1/34* (2013.01); *B32B 29/005* (2013.01); *B65D 65/40* (2013.01); *B65D 65/42* (2013.01); *B65D 65/466* (2013.01); *B32B 2255/12* (2013.01); *B32B 2255/26* (2013.01); *B32B 2439/02* (2013.01)

(58) Field of Classification Search
CPC .......... B65D 1/34; B32B 29/005; A47G 19/03
USPC .................. 229/406, 407; 220/574, 669, 675
See application file for complete search history.

(56) References Cited

U.S. PATENT DOCUMENTS

| | | |
|---|---|---|
| D232,998 S | 10/1974 | Molzen |
| D239,689 S | 4/1976 | Doman |
| 5,050,791 A | 9/1991 | Bowden |

(Continued)

FOREIGN PATENT DOCUMENTS

| | | |
|---|---|---|
| CA | 2422713 A1 | 4/2002 |
| CA | 2475816 A1 | 8/2003 |

(Continued)

OTHER PUBLICATIONS

FPI Rigidity Tester Operating Procedure, Foodservice Packaging Institute, Updated Jan. 23, 2015; 17 pages; downloaded from http://www.fpi.org/ on Oct. 26, 2017.

(Continued)

*Primary Examiner* — Nathan J Newhouse
*Assistant Examiner* — Phillip D Schmidt

(57) ABSTRACT

A compostable disposable container made from a paperboard laminate. The paperboard laminate has a first paperboard layer, a second paperboard layer, and a waterproof coating disposed between the first and second paperboard layers. One or more additional surface coatings that are water resistant can be added to outer surfaces of the laminate. The laminate structure is able to be press-formed at higher forming temperatures, resulting in a stronger, more rigid container.

18 Claims, 2 Drawing Sheets

(56) References Cited

U.S. PATENT DOCUMENTS

| | | | |
|---|---|---|---|
| 5,203,491 A * | 4/1993 | Marx | A47J 37/01 |
| | | | 220/573.1 |
| 5,366,791 A * | 11/1994 | Carr | B29C 51/14 |
| | | | 156/60 |
| 5,472,790 A | 12/1995 | Thompson | |
| D431,421 S | 10/2000 | Liu | |
| 6,164,478 A | 12/2000 | Cant | |
| D441,261 S | 5/2001 | Stein | |
| 6,422,551 B1 | 7/2002 | Brotz | |
| 6,913,255 B2 | 7/2005 | Porchia | |
| 6,979,485 B2 | 12/2005 | Karul | |
| 6,986,931 B2 | 1/2006 | Leboeuf | |
| 6,991,844 B2 | 1/2006 | Leboeuf | |
| 6,994,335 B2 | 2/2006 | Porchia | |
| 7,022,395 B2 | 4/2006 | Leboeuf | |
| 7,026,034 B2 | 4/2006 | Leboeuf | |
| 7,048,987 B2 | 5/2006 | Leboeuf | |
| 7,056,569 B2 | 6/2006 | Leboeuf | |
| 7,063,879 B2 | 6/2006 | Leboeuf | |
| 7,063,880 B2 | 6/2006 | Karul | |
| 7,078,088 B2 | 7/2006 | Leboeuf | |
| 7,208,216 B2 | 4/2007 | Leboeuf | |
| 8,141,860 B2 | 3/2012 | Goldman | |
| 8,474,689 B2 * | 7/2013 | Littlejohn | B65D 1/34 |
| | | | 229/407 |
| 8,685,505 B2 * | 4/2014 | Garant | D21H 27/36 |
| | | | 428/34.3 |
| 8,741,443 B2 * | 6/2014 | Hilbish | B65D 1/36 |
| | | | 428/34.2 |
| 11,806,972 B2 * | 11/2023 | Winterowd | B32B 37/1207 |
| 2003/0198797 A1 | 10/2003 | LeBoeuf | |
| 2004/0056403 A1 | 3/2004 | Porchia | |
| 2004/0154729 A1 | 8/2004 | LeBoeuf | |
| 2004/0157042 A1 | 8/2004 | Ackerman | |
| 2004/0157051 A1 | 8/2004 | Trent | |
| 2004/0224134 A1 | 11/2004 | Trent | |
| 2006/0194456 A1 | 8/2006 | Cawley | |
| 2006/0208054 A1 | 9/2006 | Littlejohn | |
| 2007/0170629 A1 | 7/2007 | Goldman | |
| 2008/0048376 A1 | 2/2008 | Farmer | |
| 2010/0264202 A1 | 10/2010 | Littlejohn | |
| 2011/0086141 A1 * | 4/2011 | Strilich | B65D 75/5855 |
| | | | 426/106 |
| 2012/0248180 A1 * | 10/2012 | White | A47G 19/03 |
| | | | 229/407 |
| 2012/0292226 A1 * | 11/2012 | Hilbish | B65D 1/34 |
| | | | 156/224 |
| 2013/0008816 A1 * | 1/2013 | Aumais | B32B 27/08 |
| | | | 53/461 |
| 2015/0147544 A1 * | 5/2015 | Minsky | B32B 7/12 |
| | | | 428/479.6 |
| 2017/0166384 A1 * | 6/2017 | Walsh | B65D 5/566 |
| 2018/0037360 A1 * | 2/2018 | Walsh | B32B 27/32 |
| 2019/0071837 A1 * | 3/2019 | Krasnoff | B32B 5/024 |
| 2019/0202191 A1 * | 7/2019 | Toft | B32B 27/10 |

FOREIGN PATENT DOCUMENTS

| | | | | |
|---|---|---|---|---|
| CA | 2515620 | A1 | 8/2004 | |
| CA | 2515678 | A1 | 8/2004 | |
| CH | 705696 | A2 * | 4/2013 | B32B 1/02 |
| DE | 29908239 | U1 | 3/2000 | |
| DE | 102017122478 | B4 * | 9/2022 | B32B 27/12 |
| EP | 3278972 | B1 * | 10/2020 | B32B 1/02 |
| WO | 0228577 | A2 | 4/2002 | |
| WO | 03068492 | A2 | 8/2003 | |
| WO | 2004071756 | A1 | 8/2004 | |
| WO | 2004071757 | A1 | 8/2004 | |
| WO | 2005123383 | A1 | 12/2005 | |
| WO | 2007084723 | A2 | 7/2007 | |

OTHER PUBLICATIONS

FPI Rigidity Tester, Foodservice Packaging Institute; 1 page; downloaded from http://www.fpi.org/ on Oct. 26, 2017.

Product Specification Catalog. 2013. Sabert. (Year: 2013), 92 pages.

\* cited by examiner

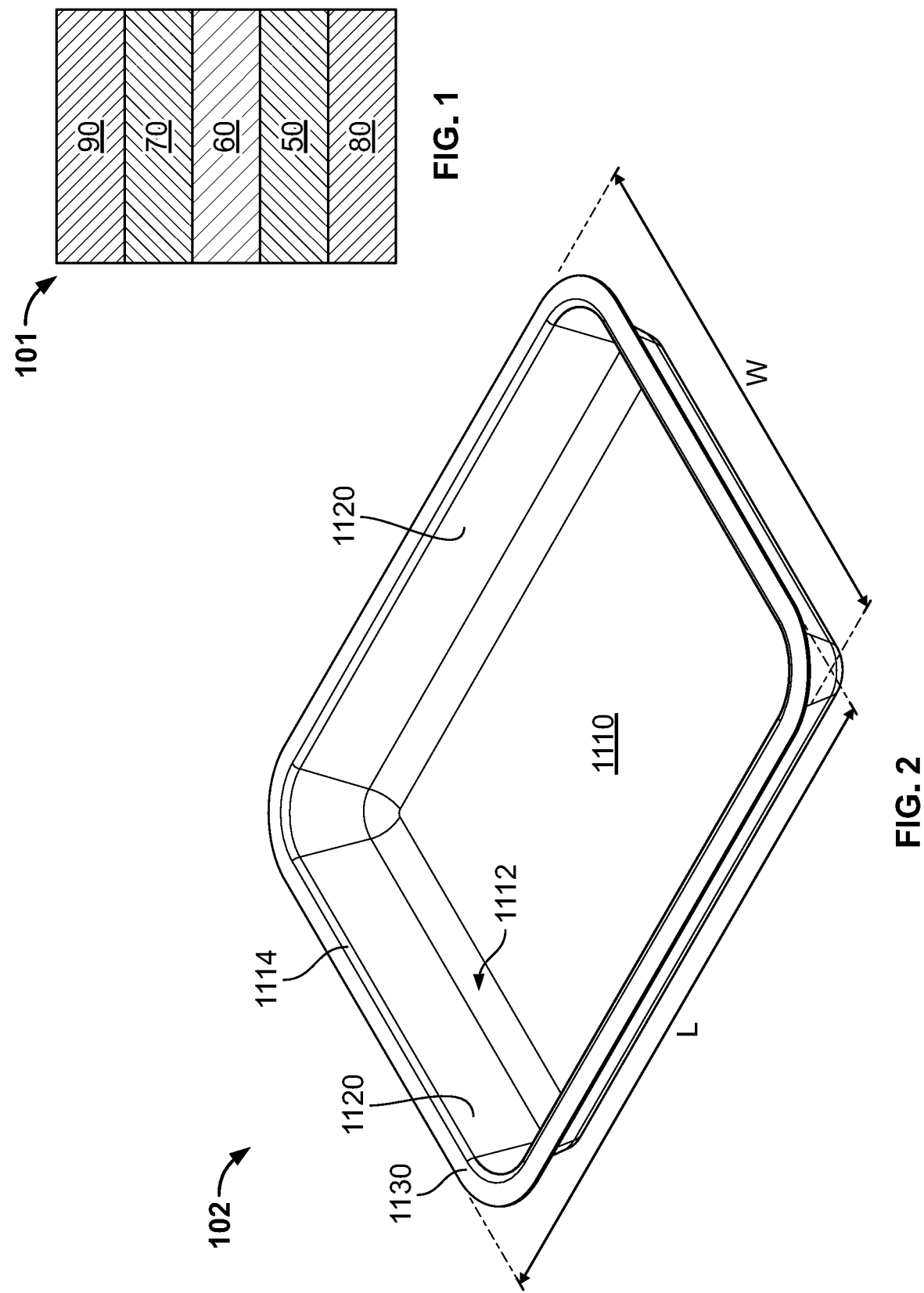

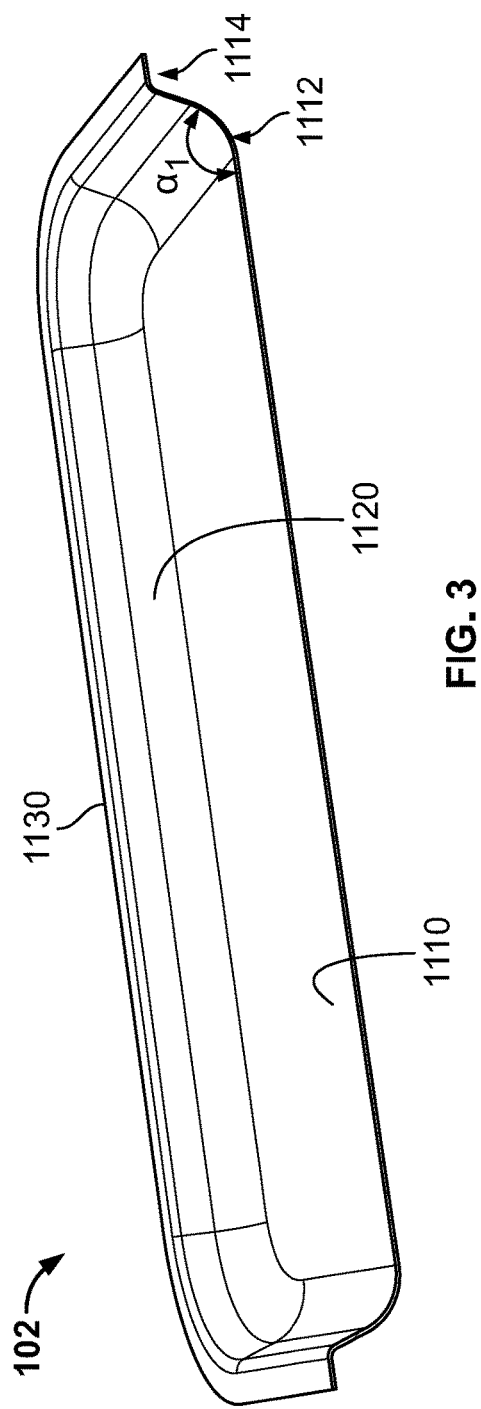
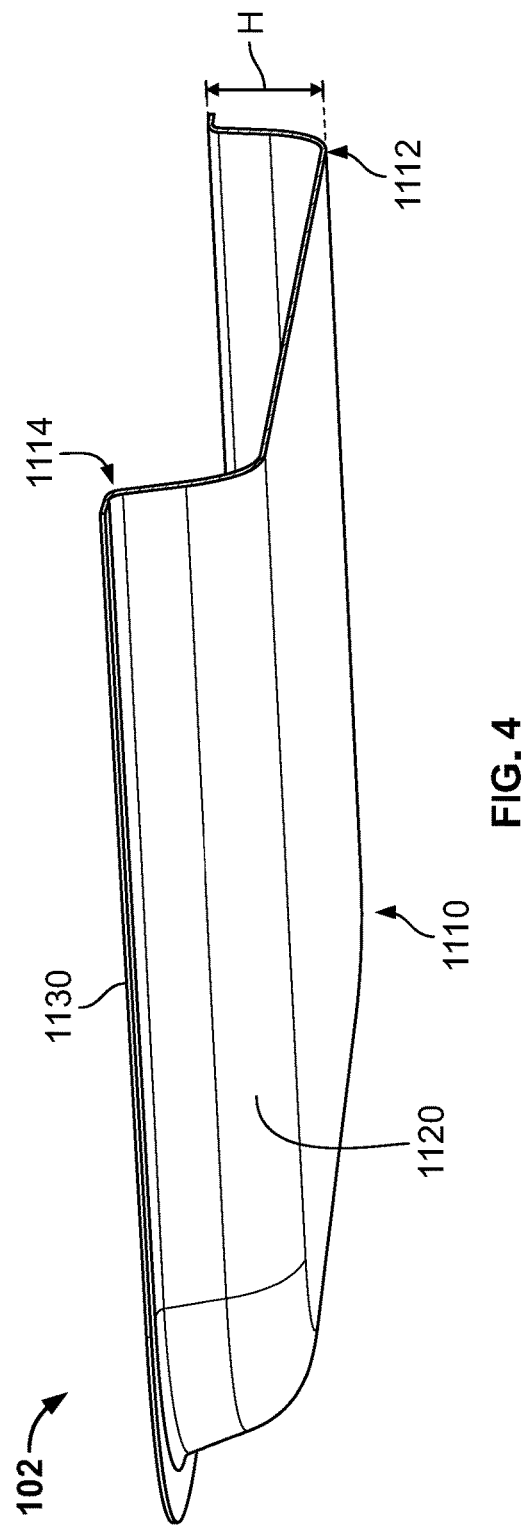
FIG. 3
FIG. 4

PRESS-FORMED DISPOSABLE CONTAINER MADE FROM A LAMINATED PAPERBOARD STRUCTURE

CROSS-REFERENCE TO RELATED APPLICATIONS

This application is a continuation-in-part of application having Ser. No. 14/943,694, filed on Nov. 17, 2015, which claims priority to U.S. Provisional Patent Application having Ser. No. 62/080,659, filed on Nov. 17, 2014. Both of which are incorporated by reference herein.

BACKGROUND

Field

Embodiments described herein generally relate to pressware products. More particularly, such embodiments relate to pressed paperboard products, such as disposable cutting boards, trays and containers.

Description of the Related Art

Traditional cutting boards, trays and containers can be a source of food contamination. Such food contamination can include the transfer of bacteria, viruses, food particles, liquids, juices, fats, grease, or overwhelming flavors from one food item to another that both contact the cutting board, tray or container during the preparation and handling of various food items.

Disposable cutting sheets have been used to reduce or eliminate the potential of food contamination if the cutting sheets are used with only one food type and discarded after each use. Disposable cutting sheets are generally formed of thin plastic films and are flimsy and easily punctured or cut. This lack of rigidity reduces the usefulness of disposable cutting sheets when preparing food since the cutting sheets cannot be used to support heavy food items when transporting the food, such as when carrying from a countertop to a stovetop.

In a similar vein, expanded Polystyrene (EPS) is the lowest cost and strongest packaging available for the disposable containers and display cases in grocery stores. EPS is difficult to recycle, however, due to the lack of facilities that accept EPS products. As a result, consumer dislike for single use foam products has grown, leading to cities and states taking legislative action against single use EPS foam, including disposable containers.

Attempts have been made to replace EPS foam disposable containers with alternative materials, such as molded pulp and sugarcane. To obtain strength and rigidity properties equivalent to EPS foam, however, the alternatives are price prohibitive in comparison with the low price of EPS.

Various paper products, such as paper sheets, plates, or trays, have also been used to reduce or eliminate food contamination. However, like disposable cutting sheets, many of the paper products can also be easily punctured, cut, or torn. Paper sheets can be inexpensively fabricated at dimensions similar to traditional cutting boards or trays. However, paper sheets are flat and thus do not have means for containing escaping liquids that typically are released by food items prepared thereon. The dimensions of paper plates can be a limitation for being effective cutting boards or trays. Round paper plates with typical diameters of 6 inches to 10 inches, for example, do not possess enough usable surface area and have sidewalls that hinder or prohibit the ability to cut, serve, or otherwise prepare, store or transport food items thereon. Paper trays, however, are generally much larger than paper plates, but also lack the needed rigidity for supporting heavy food items.

There is a need, therefore, for cutting boards and trays made from disposable paperboard.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. The drawings are not necessarily to scale and certain features and certain views of the drawings can be shown exaggerated in scale or in schematic for clarity and/or conciseness. It is to be noted, however, that the appended drawings illustrate only typical embodiments of this invention and are therefore not to be considered limiting of its scope, for the invention can admit to other equally effective embodiments as defined in the claims.

FIG. 1 depicts a cross-section of an illustrative laminated structure, according to one or more embodiments described.

FIG. 2 depicts a perspective view of an illustrative press-formed disposable container, according to one or more embodiments described.

FIG. 3 depicts an illustrative sectional view of the disposable container depicted in FIG. 2 along its length, according to one or more embodiments described.

FIG. 4 depicts an illustrative sectional view of the disposable container depicted in FIG. 2 along its width, according to one or more embodiments described.

DETAILED DESCRIPTION

Disposable containers and trays are provided herein. The disposable containers and trays can include or can be formed from one or more types of materials and/or one or more layers that can provide a suitable rigidity. In some embodiments, the disposable containers and trays can include or can be formed, pressed, press-formed, molded, or otherwise made from paper, paperboard, fiber, fibrous materials, fiberboard, pulp, pulp molded paper, pulp molded paperboard, webbing, clay, starch, sizing agents, natural or synthetic materials, plastic or polymeric fibers or materials including acrylic, styrene acrylic, polyethylene, polypropylene, polyethylene terephthalate, latex, or any mixture thereof. The disposable containers and trays can include one or more layers, films, laminates, or materials coated thereon and/or contained within. In some examples, the disposable containers and trays can include a clay coating, an acrylic-based coating, and/or an extruded coating or laminate film that can include polyethylene, polypropylene, polyethylene terephthalate, derivatives thereof, or any mixture thereof. The disposable containers and trays can include or can be formed from one or multiple layers. In some examples, the disposable containers and trays can include or can be formed from 1 to 15, or more layers, for example, but not limited to, a paperboard that contains multiple layers or films.

According to one or more embodiments, disposable containers and trays are provided that are constructed of two or more layers of paperboard with a waterproof coating disposed therebetween. The outer surfaces of the paperboard can be further coated with one or more water resistant coatings. By locating the waterproof coating within the paperboard layers, it has been discovered that press-formed paperboard products with desirable wet and dry strength properties are simpler and more cost effective compared to other paperboard containers having a waterproof coating as an exterior or outer coating.

By "waterproof", it is meant that the individual layer or coating has a Cobb Value of 0 (zero) grams/m² as measured by the TAPPI test method T 441 (120 seconds), meaning 100% water and grease absorption protection (i.e. impermeable). The terms "water resistant" and "moisture resistant" are used interchangeably herein and both refer to a coating or material having a Cobb Value greater than 0 (zero) g/m² as measured by the TAPPI test method T 441 (120 seconds), meaning less than 100% water and grease absorption protection. As such, the terms "water resistant" and "moisture resistant" refer to coatings or materials that can absorb water or moisture or other liquids.

FIG. 1 depicts an illustrative cross-section of a laminated structure 101, according to one or more embodiments. The laminated structure 101 can include a first base sheet or substrate 50, a second base sheet or substrate 70, and a waterproof coating or layer 60 disposed between the first base sheet 50 and the second base sheet 70. Each base sheet 50, 70 can be a single layer of material and/or can be two or more individual layers laminated or otherwise adhered together. Preferably, each base sheet 50, 70 is made of pare or paperboard. Any portion of the outer surfaces of each base sheet 50, 70 can be coated with one or more coatings or layers 80, 90. Any one or both outer coatings 80, 90 can be water resistant.

Each base sheet 50, 70 can be the same or different and can be made from paper or paperboard. The paper or paperboard can be bleached or unbleached Kraft paper. The paper or paperboard also can be formed from a blend of natural Kraft unbleached fibers and bleached fibers. Each base sheet 50, 70 can be printed or not. Each base sheet 50, 70 can be aseptic.

The thickness or caliper of each base sheet 50, 70 can be the same or different. The thickness can vary between about 2 mils to about 24 mils. The thickness of each base sheet 50, 70 can also range from a low of about 2 mil to a high of about 22 mils. For example, the thickness of each base sheet 50, 70 can range from a low of about 2 mils, 5 mils or 8 mils to a high of about 16 mils, 20 mils, or about 24 mils. The thickness of each base sheet 50, 70 can also be about 2 mils, about 5 mils, about 8 mils, about 14 mils, or about 19 mils. A ratio of the thickness of the first base sheet 50 to the thickness of the second base sheet 70 can be greater than 1:1, meaning one base sheet can be thicker than the other. This ratio can be as much as about 5:1 or about 10:1, and can range from 1.5:1 to 10:1; 2:1 to 5:1; or 2:1 to 4:1. Preferable ratios can be about 4:1, about 3:1 and about 2:1. In a preferred embodiment, the base sheet protected from water or juices by the coating layer 60 is the thicker sheet of the two.

The basis weight of each base sheet 50, 70 can be the same or different. The basis weight of each base sheet 50, 70, for example, can range from about 30 lbs/ream to about 250 lbs/ream. For example, the basis weight of each base sheet 50, 70 can range from a low of about 30, about 60, or about 120 lbs/ream to a high of about 160, about 210, or about 250 lbs/ream. The basis weight of each base sheet 50, 70 can also be about 30 lbs/ream to about 220 lbs/ream, or about 40 lbs/ream to about 200 lbs/ream, or about 60 lbs/ream to about 180 lbs/ream. In certain embodiments, the basis weight of each base sheet 50, 70 can be about 35 lbs/ream, about 45 lbs/ream, about 65 lbs/ream, about 100 lbs/ream, about 120 lbs/ream, about 175 lbs/ream, or about 230 lbs/ream. As used herein, the term "ream" refers to 3,000 ft² of material.

One or both of the outer surfaces of the base sheet 50, 70 can be surface treated to increase the surface energy to render the outer surface more receptive to the coatings 60, 80, 90. The surface treatment can be carried out according to one of the methods known in the art including corona discharge, flame, plasma, chemical treatment, or treatment by means of a polarized flame.

The waterproof coating or layer 60 can be disposed on or over the first base sheet 50, or it can disposed under the second base sheet 70. In another embodiment, waterproof coating or layer 60 can be disposed over the first base sheet 50 and under the second base sheet 70. In this embodiment, the waterproof coating 60 added to the first base sheet 50 could be the same or different than the waterproof coating 60 added to the second base sheet 70. The waterproof coating 60 can entirely or at least substantially cover the underlying base sheet 50, 70 to which it is applied.

The waterproof coating 60 can be formed from any one or more polymers or resins provided the resulting coating 60 is capable of achieving a Cobb Value of 0 (zero) grams/m², as measured by the TAPPI test method T 441 (120 seconds), meaning 100% water and grease absorption protection (i.e. impermeable). Suitable polymers or resins, for example, can include acrylic, styrene acrylic, polyethylene, polyethylene terephthalate, other ethylene copolymers, polypropylene, propylene copolymers, nylon 6,6, latex, polyvinylidene chloride, or any blends or combinations thereof.

The waterproof coating 60 can also be formed from one or more bio-degradable and/or one or more compostable materials. Suitable bio-degradable and/or compostable materials, for example, can be or can include cellulose, starch (e.g. grain starch, root starch, vegetable starch), plant fiber, polyvinyl alcohol (PVOH), ethylene vinyl alcohol (EVOH), polylactic acid (PLA), polyamide-epichlorohydrin (PAE), poly(beta-amino) esters (PBAE), polycaprolactone (PCL), polybutylene succinate (PBS), polyhydroxyalkanoates (PHA), polyvinyl butyral (PBV), polybutyrate adipate terephthalate (PBAT), or similar compositions. The biodegradable and/or compostable materials can be used individually, or in any combination.

The waterproof coating 60 can optionally include one or more tackifiers to provide better adhesive to the surrounding base sheets 50, 70. The tackifiers are preferably bio-based and/or biodegradable. The amount of the tackifier, if present, can range from a low of about 1 wt %, about 3 wt %, or about 5 wt % to a high of about 10 wt %, about 12 wt %, or about 15 wt %, based on the total weight of the coating 60. A suitable tackifier can provide a peel strength between the plies 50, 70 of less than about 340 g/2.54 cm, less than about 280 g/2.54 cm, or less than about 220 g/2.54 cm at a temperature of about 23° C. The peel strength can range from a low of about 100 g/2.54 cm, about 150 g/2.54 cm, about 200 g/2.54 cm, about 215 g/2.54 cm, or about 235 g/2.54 cm to a high of about 255 g/2.54 cm, about 270 g/2.54 cm, or about 285 g/2.54 cm at a temperature of about 23° C.

Each coating 80, 90 can be sprayed, press applied, extruded or combinations thereof, depending on the number and types of coatings used. Each coating 80, 90 can completely or substantially cover its adjacent layer 50, 70. Alternatively, each coating 80, 90 only partially covers its adjacent base sheet 50, 70.

The water resistant coatings 80, 90 are preferably formed from the one or more of the biodegradable and/or one or more compostable materials described herein. It is preferable that each water resistant coating 80, 90 is made of at least 85 wt %, at least 90 wt %, at least 93 wt %, at least 96 wt %, at least 98 wt %, at least 99 wt %, or about 100 wt % of the one or more biodegradable and/or compostable materials.

The waterproof coating 60, any of the outer coatings 80, 90 and any of the base sheets 50, 70 can further include one or more additives that do not affect the compostable nature of the overall laminate 100. For instance, any one or more of the waterproof coating 60 optional outer coatings 80, 90, or substrates 50, 70 described above or elsewhere herein can include one or more colorants to provide color and graphics to the individual layer(s) or substrate(s). Any suitable colorant can be used, including any one or more pigments, inks, paints, dyes, and combinations thereof. Suitable colorants that affect or modify opacity and brightness can also be used. If any one or more additives are present in an individual coating or sheet, each coating or sheet could include less than 5.0 wt %, less than 4.0 wt %, less than 3.0 wt %, less than 3.0 wt %, or less than 1.0 wt % of such additive(s).

Each coating layer 60, 80, 90 can have a thickness ranging from a low of about 0.002 mm, about 0.005 mm, about 0.01 mm, about 0.03 mm, about 0.05 mm, about 0.07 mm, or about 0.1 mm to a high of about 0.15 mm, about 0.17 mm, about 0.2 mm, about 0.25 mm, about 0.3 mm, or about 0.35 mm.

Each coating layer 60, 80, 90 can have the same or different basis weight. Each coating layer 60, 80, 90, for example, can have a basis weight of about 1 lbs/ream to about 20 lbs/ream. For example, the basis weight of each coating layer 60, 80, 90 can range from a low of about 1, about 2, or about 3 lbs/ream to a high of about 12, about 16, or about 20 lbs/ream. The basis weight of each coating layer 60, 80, 90 can also range from a low of about 2, about 4, or about 6 lbs/ream to a high of about 12, about 15, or about 20 lbs/ream.

In one specific embodiment, the laminated structure 101 can be formed by backside-coating either base sheet 70, or topside coating base sheet 50, or backside coating 70 and topside coating 50 with the waterproof layer 60, and then laminating that coated structure to the other base sheet 50, 70. The top and/or bottom surface of the resulting structure of layers 50, 60, 70 can then be further coated with the water resistant layers 80 and/or 90. One or more adhesives can be used between any of the layers 50, 60, 70, 80, 90 to improve or facilitate adhesion therebetween. Alternatively, the waterproof layer 60 can serve as the binder or adhesive.

The laminated structure 101 can be or can provide a substantially planar blank that can be press-formed to any desired shape having any desired dimensions. The press-formed product can have various shapes and sizes including multi-sided or polygonal shapes that have straight, arched, or curved sides, or any combination thereof. Illustrative polygonal shapes can include a triangle, rectangle, square, pentagon, hexagon, heptagon, octagon, nonagon, decagon, trapezoid, rhombus, or other polygons. The press-formed product can have angled or rounded corners. The press-formed product can also be round or circular like a plate, bowl, or similar structure.

The laminated structure 101 can be laminated in-situ within a forming die. In this embodiment, two rolls of paperboard (base sheets 50, 70) can be pressed at the same time about the waterproof layer 60 (an optional adhesive could be used if necessary). The heat and pressure from the forming die can laminate the two base sheets 50, 70 together while press-forming a product from the laminated structure 101.

The laminated structure 101 is particularly suitable for making disposable food containers, such as plates, bowls, trays or the like. In particular, the laminated structure 101 is particularly suitable for making disposable pressware paperboard food containers. The waterproof coating 60 prevents any water, juices, marinades, dressings, oil, grease, gravy, blood, or other food related liquids from contacting at least one of the base sheets 50, 70, thereby maintaining the structural integrity of the press-formed product made from the laminated structure 101.

By locating the waterproof layer 60 within the base sheets 50, 70, the waterproof layer 60 is thermally insulated from the forming dies. As such, higher forming temperatures can be used to form the press-formed product. Conventional thermoplastics like polypropylene, which has excellent barrier properties, melt when contacted by the heated dies during the forming process and tend to stick to the die, causing unnecessary delays for cleaning and maintenance. The melt temperature of polypropylene is about 320° F. and its softening temperature is lower, so conventional press forming processes are operated at temperatures typically of about 260° F. to 280° F., to obtain a good balance between product formation and release from the die. Amorphous PET has a softening temperature of about 185° F., so conventional press forming processes are operated at punch temperatures of 120 to 180° F. to avoid sticking. Biopolymer coatings also have a relatively low softening temperature and require lower press forming die temperatures to avoid sticking. Higher forming temperatures, however, result in press-formed products with higher strength than similar press-formed products formed at lower temperature. Therefore, it is more desirable to press-form at temperatures above the melting points of polyethylene and polypropylene. By "higher forming temperatures" it is meant the laminated structure can be formed at a temperature of at least 300° F., at least 320° F., at least 330° F., at least 350° F., at least 360° F. or at least 380° F. For example, the forming temperature can range from a low of about 300° F., 320° F., or 340° F. to a high of about 400° F., 350° F. or 500° F.

Another advantage of locating the waterproof layer 60 within surrounding base sheets 50, 70 is sufficient water hold-out. The inner waterproof coating layer 60 will block fluids and prevent them from contacting the first or lower base sheet 50, thereby not compromising the dry strength of the lower base sheet 50. As such, it is possible to design the strength of the laminated structure 101 using only the strength of one of the base sheets 50, 70 that is protected from fluids by the waterproof coating 60. Moreover, an advantage of coating at least one of the base sheets 50, 70 with a water resistant coating 80, 90 is that moisture is able to escape from the base sheets 50, 70 (through the coating 80, 90) during the forming process. This is especially advantageous when forming at higher temperatures.

For simplicity and ease of description, embodiments of the present invention will be further described with reference to a press-formed meat tray 102 made from the laminated structure 101. The meat tray 102 can have any shape or size, and can be used for storing or transporting fruit, vegetables, poultry, beef, pork, sausage, brats, or any other type of meats or food.

FIG. 2 depicts a perspective view of an illustrative rectangular meat tray 102, according to one or more embodiments. FIG. 3 depicts an illustrative sectional view of the meat tray 102 along its length and FIG. 4 depicts an illustrative sectional view of the meat tray 102 along its width. Referring to FIGS. 2-4, the meat tray 102 can have a bottom panel 1110, an inner sidewall 1120, and a flange 1130 that can extend outwardly from the inner sidewall 1120. The flange 1130 is generally flat and has no curvatures. The width of the flange 1130 can be about 0.05 inches to about 0.5 inches, more preferably about 0.15 to about 0.30 inches or about 0.15 to about 0.25 inches.

The disposable meat tray 102 can also have a first annular transition portion 1112 that extends upwardly and outwardly from the bottom panel 1110 to the inner sidewall 1120 defining a first radius of curvature, R1, and a second annular transition portion 1114 that extends outwardly the inner sidewall 1120 to the flange 1130 defining a second radius of curvature, R2. R2 can be 125 mils or less and the ratio of R2/D can be 0.0125 or less where D is the characteristic diameter of the tray 102.

As used herein, the characteristic diameter (D) is an average of the length (L) and the outer width (W), as measured through the center of the disposable meat tray 102. In some examples, the characteristic diameter (D) can be about 127 mm (5 inches) to about 317 mm (12.5 inches); or about 150 mm to about 220 mm; or about 170 mm to about 200 mm. The characteristic diameter (D) can also range from a low of about 120 mm, 140 mm, or about 150 mm to a high of about 100 mm, 200 mm, or 320 mm. The ratio of R2/D can be about 0.0025 to about 0.0125. The ratio of R2/D can also range from a low of about 0.0025, 005, or 0.006 to a high of about 0.010, 0.011, or 0.0125. The ratio of height to characteristic diameter (H/D) can be about 0.08 to about 0.25.

The inner sidewall 1120 can extend upwardly and outwardly from the bottom panel 1110 at an angle α1, as measured from the plane of the bottom panel 1110 to the plane of the inner sidewall 1120. The angle α1, therefore, is depicted extending outwardly, greater than 90°. The angle α1 can range from a low of about 95°, about 100°, or about 105° to a high of about 110°, about 120°, about 130°, about 140°, or about 150°. The angle α1 can also be greater than 90° to about 145°, greater than 90° to about 135°, greater than 90° to about 125°, greater than 90° to about 120°, greater than 90° to about 110°, or greater than 90° to about 100°. For example, the angle α1 can be about 95° to about 145°, about 95° to about 135°, about 95° to about 125°, about 95° to about 120°, about 95° to about 115°, about 95° to about 110°, about 95° to about 105°, or about 95° to about 100°. In other examples, the angle α1 can be about 105° to about 145°, about 105° to about 135°, about 105° to about 130°, about 105° to about 125°, about 105° to about 120°, about 105° to about 115°, or about 105° to about 110°. In some specific examples, the angle α1 can be about 100° to about 135°, about 100° to about 130°, about 100° to about 125°, about 100° to about 120°, about 100° to about 115°, about 110° to about 135°, about 110° to about 130°, about 110° to about 125°, about 110° to about 120°, or about 110° to about 115°.

The meat tray 102 has a height indicated by the height (H). The height (H) is the vertical distance extending from the bottom panel 1110 to the top of the flange 1130, as depicted in FIG. 4. The height (H) can be at least about 6 mm, about 8 mm, about 10 mm, about 13 mm, about 17 mm, or about 20 mm. The height (H) can range from a low of about 6 mm, 10 mm, or 12 mm to a high of about 20 mm, 25 mm, or 30 mm, or 35 mm, or 40 mm, or 45 mm. The height (H) can also be about 13 mm to about 15 mm, about 13 mm to about 20 mm, about 10 mm to about 45 mm, or about 12 mm to about 35 mm.

The laminated structure 101 can be completely planar or substantially planar prior to being pressed and formed into the disposable meat tray 102. In some embodiments, the laminated structure can be scored and/or pleated before being press-formed. For example, the laminated structure can have one or more scores disposed or otherwise formed in or at each corner. The laminated structure can have one, two, three, four, five, six, seven, eight, or more scores at each corner, such as, for example, but not limited to, about three scores to about six scores.

The disposable meat tray 102 can include two or more sides of different lengths, such that the disposable meat tray 102 and/or the laminated structure can include one or more long sides (L) and/or one or more short sides (W) (e.g., relative to the long sides). In some embodiments, the disposable meat tray 102 can include one or more sets of long sides (e.g., two or more long sides) and one or more sets of short sides (e.g., two or more short sides).

The disposable meat tray 102 can maintain a relatively high degree of rigidity despite having a relatively large surface area of the bottom panel 1110. The disposable meat tray 102 can be evaluated for rigidity. "Rigidity" refers to FPI Rigidity in grams at 0.5" deflection as hereinafter described. Normalized Rigidity is the FPI Rigidity divided by basis weight (lbs per 3000 square foot ream). The FPI Rigidity can be measured using a Food Service Packaging Institute Rigidity Tester, available from or through the Food Service Packaging Institute, 150 S. Washington Street, Suite 204, Falls Church, VA 22046.

In some examples, the Normalized FPI rigidity of the disposable meat tray 102 and/or the laminated structure 101 can range from a low of about 1.5 g/lb basis weight to about 2.6 g/lb basis weight. A basis weight of the disposable meat tray 102 and/or the laminated structure 101 can range from a low of about 80 lbs/3,000 ft$^2$, about 120 lbs/3,000 ft$^2$, or about 200 lbs/3,000 ft$^2$ to a high of about 250 lbs/3,000 ft$^2$, about 300 lbs/3,000 ft$^2$, or about 350 lbs/3,000 ft$^2$. For example, the basis weight of the disposable meat tray 102 and/or the laminated structure 101 can be about 140 lbs/3,000 ft$^2$ to about 350 lbs/3,000 ft$^2$, about 150 lbs/3,000 ft$^2$ to about 320 lbs/3,000 ft$^2$, or about 160 lbs/3,000 ft$^2$ to about 250 lbs/3,000 ft$^2$.

A caliper of the disposable meat tray 102 and/or the overall laminated structure 101 can range from a low of about 10 mils, about 13 mils, about 15 mils, or about 18 mils to a high of about 22 mils, about 24 mils, about 27 mils, or about 40 mils. For example, the caliper of the disposable meat tray 102 and/or the overall laminated structure 101 can be about 10 mils to about 30 mils, about 13 mils to about 27 mils, about 15 mils to about 24 mils, about 16 mils to about 23 mils, or about 18 mils to about 30 mils.

A product to blank perimeter (P1/P2) ratio can be determined by dividing the perimeter (P1) of the disposable meat tray 102 by the perimeter (P2) of the generally planar laminated blank. The product perimeter (P1) is defined by the outermost circumference of the disposable container and the blank perimeter (P2) is defined by the outermost circumference of the generally planar laminated structure blank.

In one or more embodiments, the product perimeter (P1) of the disposable meat tray 102 can range from a low of about 500 mm, about 600 mm, or about 700 mm to a high of about 1,200 mm, about 1,200 mm, or about 1,500 mm. For example, the disposable meat tray 102 can be about 210 mm (8.25 inches) by about 146 mm (5.75 inches) and have a product perimeter (P1) of about 712 mm. The disposable meat tray 102 can also be about 254 cm (10 inches) by about 330 mm (13 inches) and have a product perimeter (P1) of about 1,168 mm (46 inches).

The product to blank perimeter (P1/P2) ratio of the disposable meat tray 102 can range from a low of about 70%, about 80%, or about 90% to a high of about 95%, about 97%, or about or about 99%. For example, the product to blank perimeter (P1/P2) ratio of the disposable meat tray 102 can be about 77% to about 99%, about 80% to about 98.5%, about 85% to about 98.5%, about 90% to about 98%, or about 92% to about 97.5%.

The length (L) of the disposable meat tray 102 can range from a low of about 15 cm, about 20 cm, about 25 cm, or about 30 cm to a high of about 40 cm, about 50 cm, or about 60 cm. The outer length (L1) of the disposable meat tray 102 can also be about 15 cm to about 60 cm, about 20 cm to about 50 cm, about 25 cm to about 50 cm, about 25 cm to about 45 cm, about 25 cm to about 40 cm, or about 25 cm to about 35 cm.

The width (W) of the disposable meat tray 102 can be a low of about 15 cm, about 20 cm, about 25 cm, or about 30 cm to a high of about 40 cm, about 50 cm, or about 60 cm. The width (W) of the disposable meat tray 102 can also be about 15 cm to about 60 cm, about 20 cm to about 50 cm, about 25 cm to about 50 cm, about 25 cm to about 45 cm, about 25 cm to about 40 cm, or about 25 cm to about 35 cm.

The surface area (SA) of the bottom panel 1110 can be a low of about 35 cm$^2$, about 50 cm$^2$, or about 70 cm$^2$ to a high of about 500 cm$^2$, about 600 cm$^2$, or about 800 cm$^2$. In other examples, the surface area (SA) of the bottom panel 1110 can be about 40 cm$^2$ to about 600 cm$^2$, about 70 cm$^2$ to about 500 cm$^2$, about 100 cm$^2$ to about 300 cm$^2$, or about 150 cm$^2$ to about 220 cm$^2$. In some examples, the surface area (SA) of the bottom panel 1110 can be about 180 cm$^2$ to about 300 cm$^2$, about 180 cm$^2$ to about 220 cm$^2$, or about 190 cm$^2$ to about 210 cm$^2$. A ratio of the height to surface area (H/SA) can range from a low of about 0.002 in$^{-1}$ to about 0.22 in$^{-1}$.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. The term "about" includes the inherent and expected tolerances and/or slight variations that would be considered by a person of ordinary skill in the art to be within the bounds of the indicated value.

While the foregoing is directed to embodiments of the present invention, other and further embodiments of the invention can be devised without departing from the basic scope thereof, and the scope thereof is determined by the claims that follow.

In the foregoing discussion and in the claims below, the terms "including" and "comprising" are used in an open-ended fashion, and thus should be interpreted to mean "including, but not limited to." The phrase "consisting essentially of" means that the described/claimed layer or coating does not include any other components that will materially alter its properties by any more than 5% of that property, and in any case does not include any other component to a level greater than 3 mass %.

To the extent a term used in a claim is not defined herein, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

What is claimed is:

1. A press-formed disposable container, comprising:
   a bottom panel;
   a first transition portion extending out and away from the bottom panel;
   a sidewall extending up and away from the first transition portion;
   a second transition portion flaring away from a distal end of the sidewall;
   an outer flange portion extending outward from the second transition portion, wherein the container is press-formed from a laminated paperboard structure, comprising:
   a lower first paperboard layer;
   a second paperboard layer;
   a waterproof coating disposed between the first and second paperboard layers; and
   a water resistant coating disposed on the second paperboard layer to provide a water resistant face.

2. The container of claim 1, wherein the water resistant coating allows moisture from the second paperboard layer to escape during press-forming.

3. The container of claim 1, further comprising a water resistant coating disposed on the first paperboard layer to provide a water resistant base.

4. The container of claim 3, wherein the water resistant coating allows moisture from the first paperboard layer to escape during press-forming.

5. The container of claim 1, wherein the waterproof coating comprises a thermoplastic polymer or a biopolymer.

6. The container of claim 1, wherein the waterproof coating comprises polyvinyl alcohol (PVOH), ethylene vinyl alcohol (EVOH), polylactic acid (PLA), polyamide-epichlorohydrin (PAE), poly(beta-amino) esters (PBAE), polycaprolactone (PCL), polybutylene succinate (PBS), polyhydroxyalkanoates (PHA), polyvinyl butyral (PBV), polybutyrate adipate terephthalate (PBAT), or combinations thereof.

7. The container of claim 1, wherein the waterproof coating comprises acrylic, styrene acrylic, polyethylene, polypropylene, polyethylene terephthalate, nylon 6,6, latex, polyvinylidene chloride, or any combination thereof.

8. The container of claim 1, wherein the waterproof coating has a melt temperature of 320° F. or less.

9. The container of claim 1, wherein the laminated paperboard structure contains at least 4 lbs per 3,000 sq. ft. ream of the waterproof coating.

10. The container of claim 1, wherein the paperboard is aseptic.

11. The container of claim 1, wherein the laminated paperboard structure has a basis weight of between 150 and 350 pounds per 3,000 sq. ft. ream.

12. The container of claim 1, wherein a ratio of the thickness of the first base sheet to the thickness of the second base sheet is greater than 1:1.

13. A press-formed disposable container, comprising:
   a bottom panel;
   a first transition portion extending out and away from the bottom panel;
   a sidewall extending up and away from the first transition portion;
   a second transition portion flaring away from a distal end of the sidewall;

an outer flange portion extending outward from the second transition portion, wherein the container is press-formed from a laminated paperboard structure, comprising:

a first paperboard layer having a first thickness;

a second paperboard layer having a second thickness, wherein a ratio of the first thickness to the second thickness is at least 3:1; and a waterproof coating disposed between the first and second paperboard layers, the waterproof coating having a Cobb Value of 0 grams/m$^2$, as measured by the TAPPI test method T 441 (120 seconds), and comprising a thermoplastic polymer or a biopolymer having a melt temperature of 320° F. or less.

14. The container of claim 13, further comprising a water resistant coating disposed on the first paperboard layer to provide a water resistant outer layer, the water resistant coating having a Cobb Value greater than 0 g/m$^2$, as measured by the TAPPI test method T 441 (120 seconds).

15. The container of claim 13, further comprising a water resistant coating disposed on the second paperboard layer to provide a water resistant outer layer, the water resistant coating having a Cobb Value greater than 0 g/m$^2$, as measured by the TAPPI test method T 441 (120 seconds).

16. A press-formed disposable container made from a laminated paperboard structure, the laminated paperboard structure comprising:

a first paperboard layer having a first thickness;

a second paperboard layer having a second thickness, wherein a ratio of the first thickness to the second thickness is greater than 1:1;

a waterproof coating disposed between the first and second paperboard layers, the waterproof coating having a Cobb Value of 0 grams/m$^2$, as measured by the TAPPI test method T 441 (120 seconds), and comprising a thermoplastic polymer or a biopolymer having a melt temperature of 320° F. or less;

a first water resistant coating disposed on an outer surface of the first paperboard layer to provide a first water resistant outer layer, the water resistant coating having a Cobb Value greater than 0 g/m$^2$, as measured by the TAPPI test method T 441 (120 seconds);

a second water resistant coating disposed on the second paperboard layer to provide a second water resistant outer layer, the water resistant coating having a Cobb Value greater than 0 g/m$^2$, as measured by the TAPPI test method T 441 (120 seconds).

17. The container of claim 16, wherein the container is a meat tray.

18. The container of claim 14, wherein the water resistant coatings each comprise at least 85 wt % of one or more biodegradable or compostable materials.

* * * * *